United States Patent [19]
Ihm

[11] Patent Number: 5,509,510
[45] Date of Patent: Apr. 23, 1996

[54] COMPOSITE DISC BRAKE ROTOR AND METHOD FOR PRODUCING SAME

[75] Inventor: Mark K. Ihm, Mt. Clemens, Mich.

[73] Assignee: Kelsey-Hayes Company, Romulus, Mich.

[21] Appl. No.: 356,031

[22] Filed: Dec. 14, 1994

Related U.S. Application Data

[63] Continuation of Ser. No. 85,712, Jun. 30, 1993, abandoned.

[51] Int. Cl.$^6$ .................................................. F16D 65/10
[52] U.S. Cl. ................................. 188/219 X L; 164/112
[58] Field of Search .......................... 188/218 X L, 188/73.1, 73.2, 18 A, 17; 192/70.11–70.3, 66, 67 R, 107 R, 107 C, 107 M, 106; D12/180; 164/98; 29/894.324, 894.321

[56] References Cited

U.S. PATENT DOCUMENTS

| | | | |
|---|---|---|---|
| 3,724,613 | 4/1973 | Bermingham | 188/251 M |
| 3,732,953 | 5/1973 | Huet | 188/218 X L |
| 4,819,769 | 4/1989 | Metzler | 164/98 |
| 4,907,677 | 3/1990 | Yamashita | 188/251 M |
| 5,183,632 | 2/1993 | Kiuchi | 419/48 |
| 5,184,663 | 2/1993 | Oono | 164/48 |

FOREIGN PATENT DOCUMENTS

| | | |
|---|---|---|
| 351237 | 1/1990 | European Pat. Off. . |
| 2109888 | 5/1972 | France . |
| 4220728 | 1/1993 | Germany .................. 188/218 X L |
| 62-233531 | 10/1987 | Japan ...................... 188/218 X L |
| 2024346 | 1/1980 | United Kingdom . |
| 2228053 | 2/1989 | United Kingdom ....... 188/218 X L |
| 8909889 | 10/1989 | WIPO . |

*Primary Examiner*—Robert J. Oberleitner
*Assistant Examiner*—Cliff Bartz
*Attorney, Agent, or Firm*—MacMillan, Sobanski & Todd

[57] ABSTRACT

A composite disc brake rotor including a generally hat-shaped rotor body cast from an alloy, and a generally annular rotor insert cast from a metal matrix composite. The rotor body includes a generally centrally located mounting surface, and a radially outwardly extending annular portion. The rotor insert includes a pair of brake friction plates which are disposed in mutually spaced apart relationship. The brake friction plates include inner surfaces and generally parallel outer surfaces. The outer surfaces of the brake friction plates define a pair of brake friction surfaces adapted to be frictionally engaged by a pair of brake pads of a disc brake assembly. In accordance with the present invention, at least one of the inner surfaces of the brake friction plates is provided with spacing elements for engagement with the inner surface of the other one of the brake friction plates for maintaining the plates in a predetermined spaced apart relationship when the rotor body is cast in situ therewith.

9 Claims, 2 Drawing Sheets

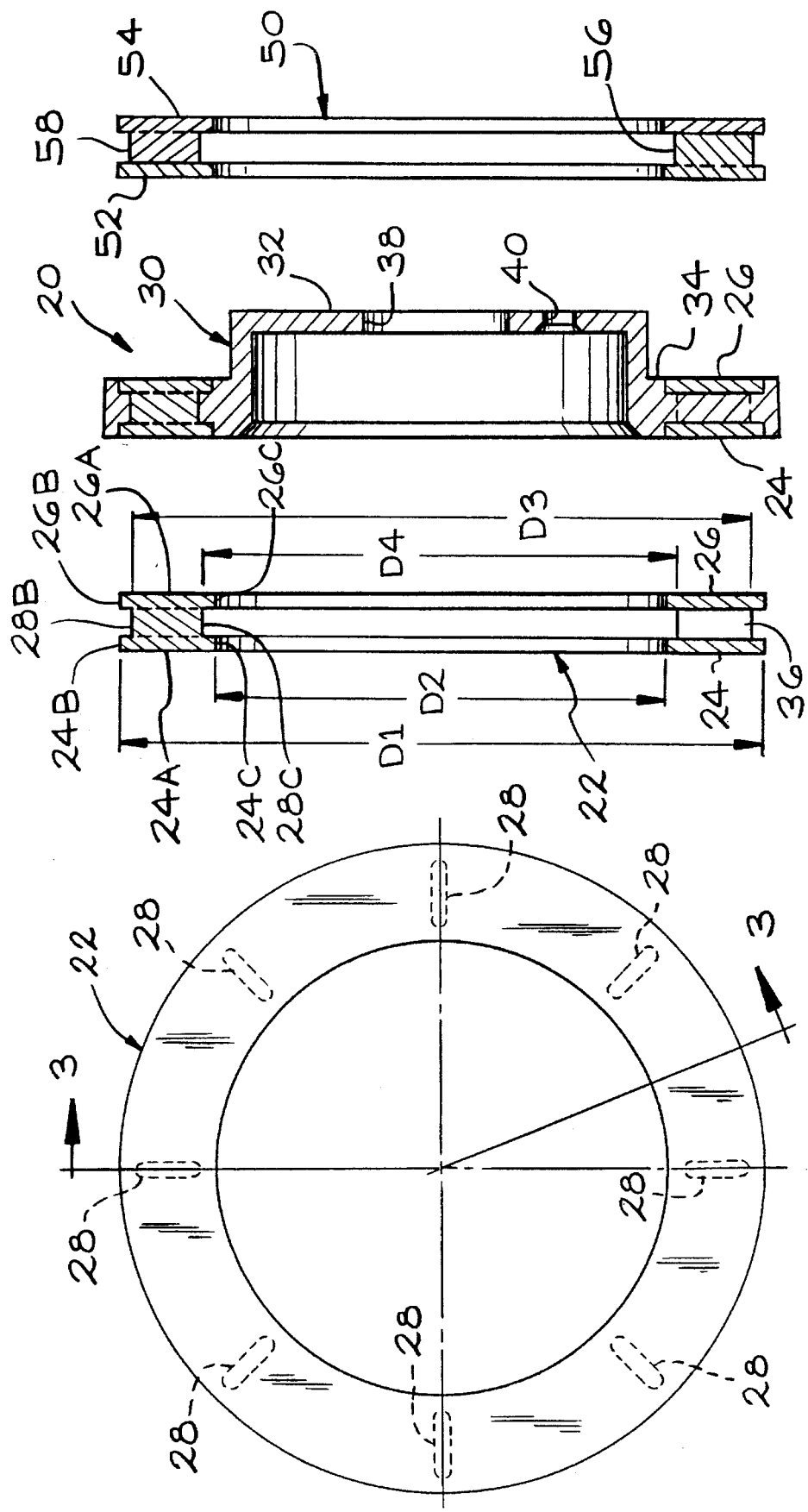

COMPOSITE DISC BRAKE ROTOR AND METHOD FOR PRODUCING SAME

This is a continuation application Ser. No. 08/085,712 filed on Jun. 30, 1993, now abandoned.

BACKGROUND OF THE INVENTION

This invention relates in general to vehicle brakes and, in particular, to an improved composite disc brake rotor for use in a disc brake assembly, and to an improved casting method for producing such a rotor.

A typical disc brake rotor is formed from grey cast iron during a sand mold casting process. The rotor includes a generally hat-shaped body, and an outer annular section which are integrally cast as one-piece during the casting process. This kind of rotor is commonly referred to as a "full cast" rotor.

The hat-shaped body includes a mounting surface having a centrally locating pilot hole formed therein during casting, and a plurality of lug bolt receiving apertures equally spaced circumferentially about the pilot hole. The lug bolt receiving apertures are formed during a machining operation. The outer annular section, of the rotor includes two parallel outer surfaces which define a pair of brake friction surfaces. The brake friction surfaces can be cast as a single solid brake friction plate, or can be cast as a pair of brake friction plates disposed in a mutually spaced apart relationship by a plurality of ribs or fins to produce a vented rotor. In some instances, the rotor is formed with an integrally cast hub, and is referred to as a "uni-cast" rotor.

While grey cast iron rotors generally possess sufficient mechanical and thermal properties to satisfy requirements of disc brake systems, they are relatively heavy and, for passenger car and light truck applications, can each weigh up to approximately 30 pounds. Since rotors are considered rotating mass and unsprung mass as well as being part of the total mass of the vehicle, the weight of the rotor adversely affects the performance and fuel economy of a vehicle.

To produce a lightweight rotor, it has been suggested to cast the rotor from an aluminum alloy, such as 319 or 356 aluminum. However, while aluminum alloy rotors possess satisfactory thermal properties, they do not possess adequate mechanical properties of high temperature strength, hardness, and wear resistance, which are typically required for disc brake applications. In order to satisfy these mechanical properties and still produce a lightweight rotor, it is known to cast the rotor from an aluminum based metal matrix composite (MMC) containing silicon carbide particulate reinforcement. Such an aluminum MMC is commercially available under the name DURALCAN, a registered trademark of Alcan Aluminium Limited of San Diego, Calif.

The aluminum MMC provides the finished rotor with sufficient mechanical and thermal properties to satisfy the requirements of brake rotor designs at a significantly reduced weight. For example, it has been found that a weight reduction of approximately 60% over a comparable grey cast iron rotor can be achieved by casting the rotor from the aluminum MMC.

One disadvantage to castings made with the aluminum MMC is that they are rather expensive compared to the costs of castings made from grey cast iron and conventional aluminum alloys. Another disadvantage is that the very hard particulate reinforcement makes the aluminum MMC castings more difficult to machine compared to grey iron and conventional aluminum castings.

U.S. Pat. No. 5,183,632 to Kiuchi et al. discloses a method for producing an aluminum "composite" disc brake rotor in which only the friction plate portions are formed of a reinforced aluminum alloy, while the remainder of the rotor is an aluminum alloy. According to this method, an aluminum alloy is first cast or press molded to form a rough-shaped disc brake rotor body. Next, an annular recessed portion (corresponding to the friction plate portions) is formed in each rotor face by machining. A separate reinforced aluminum alloy powder preform or a mixture of an aluminum alloy powder and reinforcing particles is then placed in each of the recessed portions of the rotor. The rotor body including the preform or mixture is heated to a mashy state temperature, and then molded under pressure to secure the preform or mixture to the rotor body and produce a rough-shaped disc brake rotor.

SUMMARY OF THE INVENTION

This invention relates to an improved composite disc brake rotor and method for producing the same. The composite rotor includes a generally annular rotor insert formed from a MMC which is cast in situ with a generally hat-shaped rotor body formed from an alloy. In the preferred embodiment, the rotor insert is formed from an aluminum based alloy containing silicon carbide particulate reinforcement, and the rotor body is formed from a conventional aluminum alloy, such as 356 aluminum. The rotor body includes a generally centrally located mounting surface, and a radially outwardly extending annular portion. The rotor insert includes a pair of brake friction plates which are disposed in mutually spaced apart relationship. The brake friction plates include inner surfaces and generally parallel outer surfaces. The outer surfaces of the brake friction plates define a pair of brake friction surfaces adapted to be frictionally engaged by a pair of brake pads of a disc brake assembly. In accordance with the present invention, at least one of the inner surfaces of the brake friction plates is provided with a plurality of spacing elements for engagement with the inner surface of the other one of the brake friction plates for maintaining the plates in a predetermined spaced apart relationship when the rotor body is cast in situ therewith.

The method for producing the composite disc brake rotor comprises the steps of initially casting the rotor insert, placing the rotor insert in a rotor mold, and casting the hat-shaped rotor body in the rotor mold whereby the spacing elements are effective to maintain the plates in a predetermined spaced apart relationship.

As a result of forming the composite rotor in this manner, the spacing elements maintain a predetermined spacing between the outer surfaces of the plates after the rotor body is cast in situ therewith, and control tolerances to minimize machining. Additionally, the spacing elements improve the metallurgical and mechanical bonds between the rotor insert and the rotor body.

Other advantages of this invention will become apparent to those skilled in the art from the following detailed description of the preferred embodiment, when read in light of the accompanying drawing.

BRIEF DESCRIPTION OF THE DRAWINGS

FIG. 2 is a front view of the one-piece rotor insert.

FIG. 3 is a cross sectional view of the one-piece rotor insert taken along lines 3—3 of FIG. 2.

FIG. 4 is a cross sectional view of a finished composite disc brake rotor including the one-piece rotor insert of FIGS. 1 to 3.

FIG. 6 is a cross sectional view of the two-piece insert.

DETAILED DESCRIPTION OF THE PREFERRED EMBODIMENT

Figure 1:
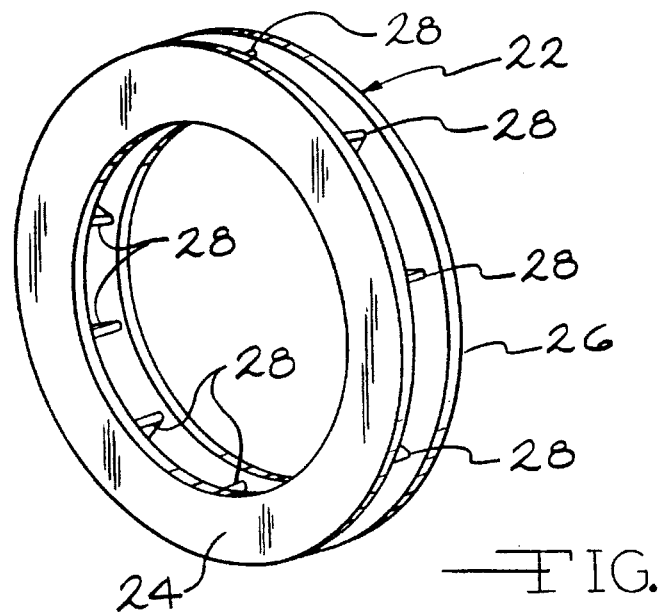
FIG. 1 is a perspective view of a one-piece rotor insert for use in a composite disc brake rotor constructed in accordance with the present invention.

Referring now to the drawings, there is illustrated in FIG. 1 a perspective view of a rotor insert 22 for use in producing a composite disc brake rotor, indicated generally at 20 in FIG. 4, in accordance with the present invention.

Initially a MMC material is cast in a mold (not shown) to produce the generally annular rotor insert 22. The casting process can be performed by any suitable casting method, such as die casting, sand casting, permanent mold casting, squeeze casting, or lost foam casting, for example. As will be discussed below, in the preferred embodiment, the rotor insert 22 is of a one-piece construction and includes a pair of integrally cast brake friction plates 24 and 26 which are disposed in mutually spaced apart relationship by a plurality of spacing elements 28.

Turning now to FIGS. 2 and 3, the specific construction of the annular rotor insert 22 will be discussed. As shown therein, the annular rotor insert 22 is of a one-piece cast construction but for discussion purposes, can be thought of as including three distinct portions, namely, a pair of spaced apart brake friction plates 24 and 26, and a plurality of spacing elements 28. Between each pair of spacing elements 28 and the plates 24 and 26, there is formed an interspace 36. As will be discussed below, the spacing elements 28 maintain a predetermined spacing between the outer surfaces 24A and 26A of the plates 24 and 26, respectively, while a rotor body is cast in situ therewith. Additionally, the combination of the spacing elements 28 and interspaces improves the mechanical and metallurgical bonds between the rotor insert 22 and the rotor body 30.

As shown in this embodiment, there are eight spacing elements equally spaced circumferentially about the rotor insert 22 which are operative to form eight interspaces 36 between the brake friction plates 24 and 26. The brake friction plates 24 and 26 include outer annular friction surfaces 24A and 26A, respectively, which are located generally parallel to one another.

The friction plates 24 and 26 further include outer peripheral ends 24B and 26B, respectively, which define a plate outer diameter D1, and inner peripheral ends 24C and 26C which define a plate inner diameter D2. Each of the spacing elements 28 includes an outer peripheral end 28B which defines an outer diameter D3, and an inner peripheral end 28C which defines an inner diameter D4.

As shown in the embodiment illustrated in FIG. 2, the outer diameter D1 of the friction plates 24 and 26 is greater than the outer diameter D3 of the spacing elements 28. Also, the inner diameter D2 of the friction plates 24 and 26 is less than the inner diameter D4 of the spacing elements 28.

In the preferred embodiment, the base alloy of the MMC is an aluminum alloy, such as for example A356 aluminum, and the particulate reinforcement of the metal matrix is silicon carbide. However, the base alloy of the MMC can comprise other alloys, such as for example, magnesium or titanium alloys. Also, the particulate reinforcement material can comprise other materials, such as for example, alumina, silicon nitride, graphite, ceramics, or other refractory type materials. In addition, in the preferred embodiment, the silicon carbide particulate reinforcement has a generally spheroidal to semi-spheroidal shape which allows the silicon carbide to be readily mixed with the aluminum alloy and form a mixed composite which is castable. However, the shape of the particulate reinforcement can be of other shapes, such as rods, whiskers, or fibers, to name a few. Furthermore, in the preferred embodiment, the volumetric content of the particulate reinforcement in the rotor insert is in the range of 10% to 30% of the total volumetric content of the composite rotor insert.

After the rotor insert 22 is cast, the rotor insert 22 is trimmed to remove any risers and gates, and is placed in a rotor mold. The rotor insert 22 is maintained in the mold in a predetermined position by suitable means, such as for example, by the cavity of the mold itself or by projections (not shown) provided on the rotor insert 22. Preferably, after the hot rotor insert 22 is removed from the mold, it is placed in the rotor mold prior to its temperature dropping below a predetermined temperature. This aids in the metallurgical bonding between the rotor insert 22 and the rotor body during the casting process. The particular predetermined temperature is dependent upon the physical properties of the selected aluminum MMC.

Alternatively, if the temperature of the rotor insert 22 has fallen below the predetermined temperature, the rotor insert 22 can be subjected to other methods to aid in the metallurgical bonding between the insert and the body. For example, the rotor insert 22 can be preheated up to a predetermined temperature and/or coated with a preselected material prior to casting the rotor body in situ with the rotor insert. Preferably, the preselected material is a metal, such as tin or zinc, having a melting temperature lower than that of the aluminum and the aluminum MMC, so that the material washes away during casting.

Once the rotor insert 22 is placed in the rotor mold, a generally hat-shaped rotor body (shown at 30 in the finish machined embodiment of FIG. 4), is cast about the rotor insert 22 to form a rough-finished rotor casting (not shown). The casting of the rotor body 30 can be performed by any suitable casting method, such as die casting, sand casting, permanent mold casting, squeeze casting, or lost foam casting.

Preferably, the hat-shaped rotor body 30 is formed from a conventional aluminum alloy, such as for example 356 aluminum. However, other alloys can be used, for example, magnesium or titanium alloys. As will be discussed below, the rotor body 30 in the embodiment shown in FIG. 4, includes a generally centrally located mounting surface 32, and a radially extending outer annular portion 34 which during casting fills the interspaces 36 defined between the brake friction plates 24 and 26 and the spacing elements 28 of the rotor insert 22 to improve the mechanical and metallurgical bonds securing the rotor insert 22 and the rotor body 30 together.

Next, the rough-finished rotor casting is trimmed and then finish machined to produce the finished aluminum MMC disc brake rotor 20, which is shown in FIG. 4. While not illustrated, the rough-finished rotor casting can be heat treated if so desired prior to finish machining operation.

FIG. 4 shows the construction of the rotor after it has been finish machined. As shown therein, the finished rotor 20 is generally hat-shaped and includes the centrally located mounting surface 32, the outer annular portion 34, and the annular rotor insert 22. The mounting surface 32 includes a centrally located pilot hole 38 formed therein during casting and machined to final dimensions during a finish machining operation, and a plurality of lug bolt receiving apertures 40 (only one aperture 40 shown) equally spaced circumferentially about the pilot hole 38 and formed during the finish machining operation.

In particular, during the finish machining of the rough-finished rotor, the outer surfaces of the rotor, including the friction surfaces 24A and 26A and the lug bolt receiving apertures 40, are finish machined to predetermined specifications. Since the spacing elements 28 maintain the predetermined distance between the outer surfaces 24A and 26A of the plates 24 and 26, respectively, only a minimal amount of the MMC material needs to be removed from the outer surfaces 24A and 26A.

Figure 5:
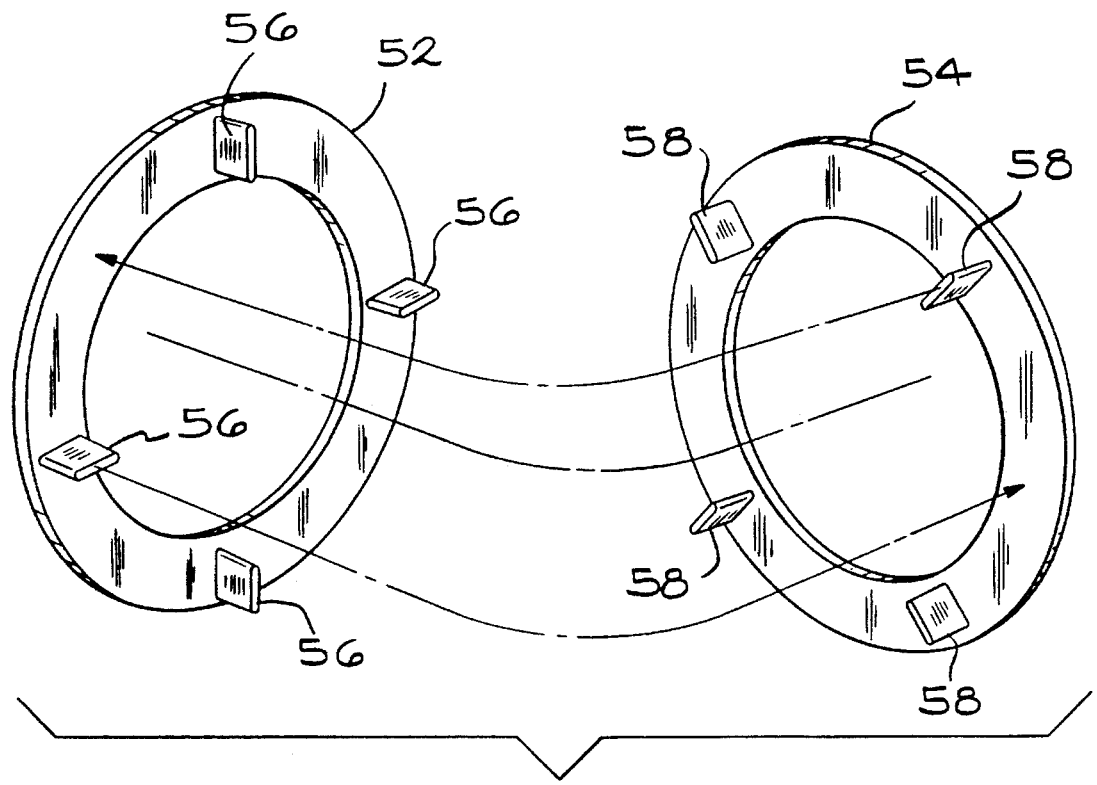
FIG. 5 is a perspective view showing an alternate embodiment of the rotor insert, wherein the insert is of a two-piece construction.

FIGS. 5 and 6 illustrate another embodiment of the rotor insert which is similar to the insert 22 of FIG. 3, except that the insert 50 comprises a pair of annular rotor inserts 52 and 54. As shown in this embodiment, the rotor inserts 52 and 54 are identical and include spacing elements 56 and 58, respectively, which are operative to space the inserts 52 and 54 apart from one another by a predetermined distance when the inserts 52 and 54 are placed in the rotor mold.

One advantage of the present invention is that the spacing elements are operative to space the brake friction plates a predetermined distance apart from one another. As a result of this, the outer surfaces of the brake friction plates are maintained the predetermined distance apart from one another while the casting of the rotor body in situ therewith. This enables less MMC material to be used to cast the rotor insert, and thus reduces the amount of machining required during the finish machining operation. Another advantage of the present invention is that the spacing elements improve both the metallurgical and mechanical bonds by securing the rotor insert relative to the rotor body in both the axial and radial directions.

While the invention has been illustrated and described as forming the annular rotor insert 22 or the inserts 52 and 54 with the particular shape, spacing, and number of spacing elements 28, 56, and 58, respectively, the specific structure can vary. For example, the shape, spacing, and number of the spacing elements 28, 56, and 58 can be varied depending upon various design considerations, such as for example, the size of the rotor. Also, while the rotor body has been shown and described as producing a full cast rotor, shown in FIG. 4, the rotor body can produce a rotor having an integral hub (not shown).

In addition, while the rotor inserts 52 and 54 shown in FIG. 5 have been described and illustrated as being identically formed, other variations are possible. For example, one of the inserts can include more of the spacing elements than the other one, or only one of the inserts can include the spacing elements the other one not including any such elements. Also, neither of the inserts can include any spacing elements formed thereon. In this case, spacers would be provided and placed in the rotor mold to space the inserts apart from one another prior to casting the rotor body in the rotor mold.

In accordance with the provisions of the patent statutes, the principle and mode of operation of this invention have been described and illustrated in its preferred embodiment. However, it must be understood that the invention may be practiced otherwise than as specifically explained and illustrated without departing from its spirit or scope.

What is claimed:

1. A solid composite disc brake rotor comprising:
    a generally annular rotor insert formed from a first material, said rotor insert including a pair of brake friction plates which are disposed in spaced apart relationship, said brake friction plates including inner surfaces and generally parallel outer surfaces which define a pair of brake friction surfaces adapted to be frictionally engaged by a pair of brake pads of a disc brake assembly;
    a plurality of circumferential spacing elements disposed and extending only between the inner surfaces of said pair of brake friction plates for maintaining said brake friction plates in said spaced apart relationship, a plurality of interspaces being defined between said circumferential spacing elements; and
    a rotor body formed from a second material, said rotor body including a mounting surface and an annular portion, said annular portion extending directly through said interspaces and completely filling and occupying said interspaces to secure said rotor insert to said rotor body.

2. The disc brake rotor defined in claim 1 wherein said rotor insert is formed from one piece of material.

3. The disc brake rotor defined in claim 1 wherein said rotor insert is formed from two pieces of material.

4. The disc brake rotor defined in claim 1 wherein said first material is a metal matrix composite and said second material is an aluminum alloy material.

5. A solid composite disc brake rotor comprising:
    a generally annular rotor insert formed from an aluminum based metal matrix composite, said rotor insert including a pair of brake friction plates which are disposed in spaced apart relationship, said brake friction plates including inner surfaces and generally parallel outer surfaces which define a pair of brake friction surfaces adapted to be frictionally engaged by a pair of brake pads of a disc brake assembly;
    a plurality of circumferential spacing elements disposed and extending only between the inner surfaces of said pair of brake friction plates for maintaining said brake friction plates in said spaced apart relationship, a plurality of interspaces being defined between said circumferential spacing elements; and
    a rotor body formed from an aluminum alloy material, said rotor body including a mounting surface and an annular portion, said annular portion extending directly through said interspaces and completely filling and occupying said interspaces to secure said rotor insert to said rotor body.

6. The disc brake rotor defined in claim 5 wherein said aluminum based metal matrix composite includes a particulate reinforcement selected from the group consisting of silicon carbide, alumna, silicon nitride, and ceramics.

7. The disc brake rotor defined in claim 6 wherein the volumetric content of said particulate reinforcement is in the range of from 10% to 30% of the total volumetric content of said rotor insert.

8. The disc brake rotor defined in claim 5 wherein said rotor insert is formed from one piece of material.

9. The disc brake rotor defined in claim 5 wherein said rotor insert is formed from two pieces of material.

\* \* \* \* \*